(12) United States Patent
Luss

(10) Patent No.: US 7,957,397 B2
(45) Date of Patent: *Jun. 7, 2011

(54) BANDWIDTH ALLOCATION FOR VIDEO-ON-DEMAND NETWORKS

(75) Inventor: Hanan Luss, Marlboro, NJ (US)

(73) Assignee: TTI Inventions C LLC, Wilimignton, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/686,947

(22) Filed: Jan. 13, 2010

(65) Prior Publication Data

US 2010/0111104 A1 May 6, 2010

Related U.S. Application Data

(63) Continuation of application No. 11/268,105, filed on Nov. 7, 2005, now Pat. No. 7,664,020.

(51) Int. Cl.
*H04L 12/56* (2006.01)
*H04J 1/08* (2006.01)
*H04N 21/24* (2011.01)
(52) U.S. Cl. .................. 370/395.41; 370/400; 370/486; 725/95
(58) Field of Classification Search .............. 370/395.2, 370/395.4, 400–408, 468, 477, 486–487; 709/223–229; 725/87, 95–98, 101
See application file for complete search history.

(56) References Cited

U.S. PATENT DOCUMENTS

| 6,269,080 | B1 | 7/2001 | Kumar |
| 6,446,125 | B1 | 9/2002 | Huang et al. |
| 6,691,312 | B1 | 2/2004 | Sen et al. |
| 6,986,156 | B1 | 1/2006 | Rodriguez et al. |
| 7,292,542 | B2 * | 11/2007 | Wright .......................... 370/256 |
| 7,543,074 | B2 * | 6/2009 | O'Neal et al. ................. 709/233 |

(Continued)

FOREIGN PATENT DOCUMENTS

WO 2007056260 A2 5/2007

OTHER PUBLICATIONS

Ogryczak, "On the Lexicographic Minimax Approach to Location Problem," European Journal of Operational Research, 100 (1997); p. 566-585.

(Continued)

*Primary Examiner* — Tri H Phan
(74) *Attorney, Agent, or Firm* — Fitch Even Tabin & Flannery

(57) ABSTRACT

A method and apparatus is provided for determining bandwidth allocation that includes initiating a transmission of a plurality of at least portions of content from a root node of a tree topology network along a path having a plurality of links connecting nodes to at least one destination node, allocating bandwidth for the plurality of at least portions of content carried on a respective link with an available bandwidth capacity such that a sum of the allocated bandwidths of all of the plurality of at least portions of content carried on the respective link does not exceed the available bandwidth capacity, and using a Lexicographic Minimax Algorithm for a Flexible or Constrained Bandwidth Allocation Model to provide bandwidth allocations to the plurality of at least portions of content and to determine an ordered list from the plurality of links from a most critical link to a least critical link.

15 Claims, 2 Drawing Sheets

U.S. PATENT DOCUMENTS

| | | | | |
|---|---|---|---|---|
| 7,646,734 | B2* | 1/2010 | Wright | 370/256 |
| 7,664,020 | B2 | 2/2010 | Luss | |
| 7,801,177 | B2* | 9/2010 | Luss | 370/468 |
| 2004/0172654 | A1 | 9/2004 | Pei et al. | |
| 2004/0199613 | A1 | 10/2004 | Hundscheidt et al. | |
| 2008/0071894 | A1* | 3/2008 | Luss | 709/223 |
| 2008/0268855 | A1* | 10/2008 | Hanuni et al. | 455/445 |

OTHER PUBLICATIONS

Betts et al., "Minimax Resource Allocation for Problems with Ordering Constraints," Naval Research Logistics, 41 (1994); p. 719-738.

Hua et al., "Video Delivery Technologies for Large-Scale Deployment of Multimedia Applications," Proceedings of the IEEE, 92 (2004); p. 1439-1451.

Klein et al.,"A Lexicographic Minimax Algorithm for Multiperiod Resource Allocation," Mathematical Programming, 55 (1992); p. 213-234.

Li et al., "Multirate Video Multicast Over the Interne: An Over," IEEE Network, Jan./Feb. 2003; p. 24-29.

Luss, "On Equitable Resource Allocation Problems: A Lexicographic Minimax Approach," Operations Research, vol. 47, No. 3 (1999); p. 361-378.

Ramesh et al., "Multicast with Cache (Mcache): An Adaptive Zero-Delay Video-on-Demand Service," IEEE Transactions on Circuits and Systems for Video Technology, vol. 11, No. 3 (2001); p. 440-456.

Sarkar et al., "Fair Bandwidth Allocation for Multicasting in Networks with Discrete Feasible Set,"IEEE Transactions on Computers, vol. 52, No. 7 (2004); p. 785-797.

PCT Search Report from related application PCT/US2006/043154; dated Feb. 11, 2008; 6 pgs.

PCT International Preliminary Report on Patentability from related application PCT/US2006/043154; dated Mar. 25, 2008; 4 pgs.

European Examination Report from related application 06836956.0; dated Jun. 23, 2009; 3 pgs.

Supplemental European Search Report from related application 06836956.0; dated Apr. 15, 2009; 1 pg.

* cited by examiner

BANDWIDTH ALLOCATION FOR VIDEO-ON-DEMAND NETWORKS

RELATED APPLICATIONS

This application is a continuation of U.S. patent application Ser. No. 11/268,105 filed Nov. 7, 2005, which is hereby incorporated by reference herein for all reasons.

FIELD OF THE INVENTION

The present invention relates to Video-on-Demand (VOD) networks. Specifically, the invention relates to the allocation of available bandwidth for video-on-demand networks and more specifically, the invention concerns bandwidth allocation on each of the links in a network among multiple VOD programs requested at the nodes of the network.

BACKGROUND OF THE INVENTION

Many telecommunications network services providers and cable TV operators are showing significant interest in provisioning Video-on-Demand (VOD) services. Moreover, major telecommunications equipment manufacturers are promoting diverse equipment for providing VOD or near-VOD services. These services are expected to grow significantly over time. Primary application areas include on-demand home entertainment, distance learning and training, and news-on-demand. These services require significant capital investments. For example, in near-VOD a server may broadcast a copy of a popular movie every five minutes. Thus, if the length of the movie is 100 minutes, the network would carry simultaneously 20 copies of the movie, which would require significant bandwidth resources.

Various topics related to VOD have been explored. For example, the papers by S. Ramesh, I. Rhee, and K. Guo, "Multicast with Cache (Mcache): An Adaptive Zero-Delay Video-on-Demand Service", *IEEE Transactions on Circuits and Systems for Video Technology* 11, 440-456, 2001, by B. Li and J. Liu, "Multirate Video Multicast Over the Internet: An Overview", *IEEE Network* 24-29, January/February 2003, and by K. A. Hua, M. A. Tantaoui, and W. Tavanapong, "Video Delivery Technologies for Large-Scale Deployment of Multimedia Applications", *Proceedings of the IEEE*, 92, 1439-1451, September 2004 discuss various VOD delivery technologies that are expected to be practical for large-scale problems. Nevertheless, even with effective VOD delivery technologies, the bandwidth requirements for VOD would be large. Since the available bandwidth on the network links is limited, an effective method of allocating the bandwidth of each link among the various VOD programs that are carried on the link is needed. Current state-of-the-art systems use ad-hoc heuristics and communications network managers' experience for VOD bandwidth allocation. Optimization-based methods for the simultaneous optimal allocation of bandwidth on all links of the VOD network would significantly enhance automated systems for managing VOD networks.

SUMMARY OF THE INVENTION

The present invention provides methods for optimal allocation of bandwidth available for each link of a tree network among multiple VOD programs. Consider a tree network with a server at the root node. The server broadcasts P different VOD programs throughout the tree network. Each node in the network has demands for a subset of the P programs. Each program has lower and upper bounds on bandwidth requirement, where the upper bound represents bandwidth required for providing excellent service, while the lower bound is the bandwidth needed to provide a minimally acceptable service. Each link on the network has a limited amount of available bandwidth. The objective is to allocate the available bandwidth on each link optimally among all programs that are carried on that link. Consider a specific program denoted as program p. The bandwidth allocated to program p may be different on different links. However, the bandwidth allocated to program p on link l cannot exceed the bandwidth allocated to program p on any link on the path between the server and link l. Hence, bandwidth allocation decisions at one link may affect the feasible allocation decisions at other links.

The present invention uses the concept of equitable resource allocation models. A performance function is associated with each program requested at each node of the network that represents the service provided for that program at the node as a function of the bandwidth allocated to that program on the incoming link to the node. A solution is equitable if no performance function value can be improved without degrading another performance function value that is already the same or worse. The solution must satisfy the bandwidth constraints on the links, the ordering constraints described above, and lower and upper bounds. H. Luss in his paper "On Equitable Resource Allocation Problems: A Lexicographic Minimax approach", *Operations Research* 47, 361-378, 1999 presents an expository paper on equitable resource allocation. L. M. Betts, J. R. Brown, and H. Luss, "Minimax Resource Allocation for Problems with Ordering Constraints", *Naval Research Logistics* 41, 719-738, 1994 present an equitable resource allocation method that can handle simple ordering constraints, but not tree-like ordering constraints needed for the invention. R. S. Klein, H. Luss, and D. R. Smith, "A Lexicographic Minimax Algorithm for Multiperiod Resource Allocation", *Mathematical Programming* 55, 213-234, 1992 solve a special case of the model in Betts, Brown, and Luss referenced above, intended for multi-period resource allocation problems. The models solved by the present invention are significantly more complex and their solution requires new, innovative methods to solve the equitable allocation problem with tree-like ordering constraints. In addition to providing optimal bandwidth allocation decisions, the model can be used to identify critical links that should be prime-candidates for capacity expansion.

The present invention will be more clearly understood when the following description is read in conjunction with the accompanying drawings.

DETAILED DESCRIPTION

Figure 1:
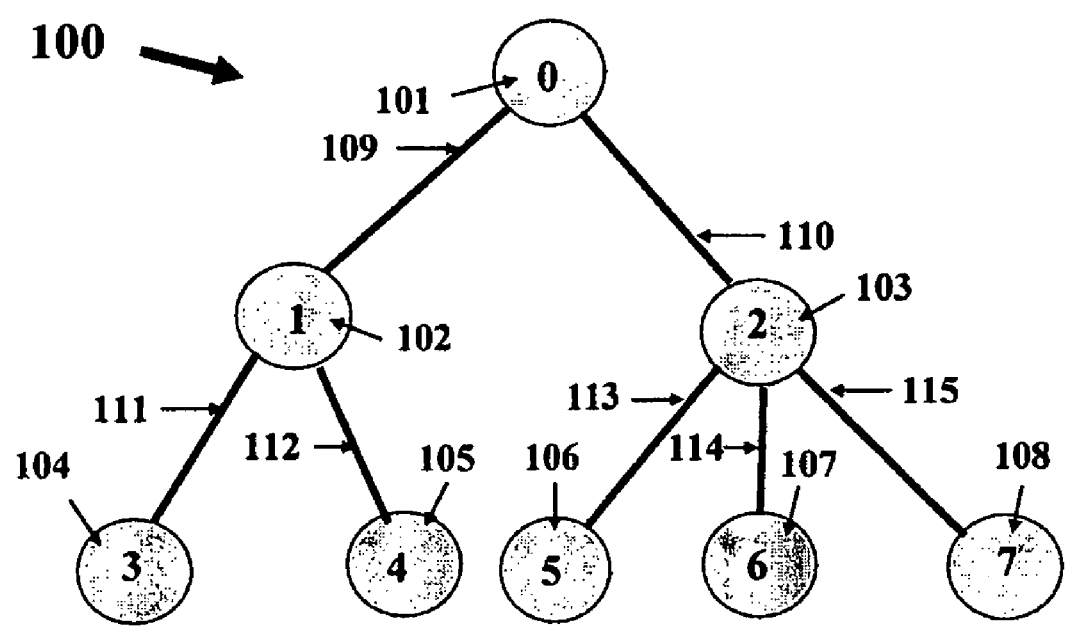
FIG. 1 illustrates the bandwidth allocation problem among multiple programs on each link of a VOD tree network.

Referring now to the figures and to FIG. 1 in particular, there is shown an example of a VOD tree network 100. The network includes eight nodes 101-108. Node 101 is the root node. The nodes are interconnected by links 109-115. Node 101 (also labeled as node 0) has the VOD server. The VOD server stores multiple programs, labeled as p=1, 2, ..., P. The server broadcasts program p to nodes that request VOD service for program p for p=1, 2, ..., P. Each link, generically called link l, has a limited bandwidth capacity of $c_l$. The sum of bandwidth allocated on link l to all programs carried on link l cannot exceed the capacity of link l. Any of the nodes, generically called node n, may decrease the bandwidth of any program p on any of the outgoing links from node n. For example, suppose the delivery technology of a VOD program comprises repeated broadcasting of the program from the root node (this technology is often referred to as near-VOD). Then, any node n may increase (or keep unchanged) the time interval between successive broadcasts of any program p on the outgoing links from node n. Increasing the time interval on a link implies decreasing the allocated bandwidth on the link. Each node n may have demands for a subset of the P programs. The information at a node may consist of the number of requests per time unit for program p, or, alternatively, only of the programs requested at node n without specifying the number of requests. The demand at node n has $D_{np}$ requests for program p per unit time.

This invention formulates the problem of allocating the available bandwidth on each link optimally among the programs carried on each link as an equitable resource allocation problem; see background material on this topic in the paper by H. Luss "On Equitable Resource Allocation Problems: A Lexicographic Minimax Approach", *Operations Research* 47, 361-378, 1999. A performance function is associated with each program requested at each node. The performance function represents the service provided for that program at the node as a function of the bandwidth allocated to that program on the incoming link to the node. A solution is equitable if no performance function value can be improved without degrading another performance function value that is already the same or worse. The invention provides new, innovative methods to solve the equitable allocation problem. In addition to providing optimal bandwidth allocation decisions, the model can be used to identify a ranking of critical links that should have their capacity expanded.

This invention provides methods for two variations of a model. The first model is referred to as the Flexible Bandwidth Allocation Model (FBAM). In FBAM the bandwidth allocated to program p on any outgoing link from node n may be different. The second model is referred to as the Constrained Bandwidth Allocation Model (CBAM). In CBAM the bandwidth allocated to program p on any outgoing link from the same node must be the same. FBAM may lead to better service since it allows more flexible allocations, while CBAM may result in a simpler design that is easier to control and maintain.

The description below uses near-VOD delivery technology for illustration purposes. Nevertheless, the invention is independent of the VOD delivery technology. All that is needed is the function that maps a technology delivery to bandwidth consumption. In near-VOD, time intervals between successive broadcasts are translated into bandwidth consumption. In a different delivery technology, all nodes may receive VOD almost instantaneously, but at different video quality, wherein the video quality is translated to bandwidth consumption on incoming links to the nodes.

| The Flexible Bandwidth Allocation Model (FBAM) | |
|---|---|
| p = | Index for programs, p = 1, 2, ... , P, where P is the number of VOD programs. Programs may be aggregated to program families, where a family is a collection of programs with similar characteristics, e.g., children's movies, eductaional programs, etc. |
| $T_p$ = | The time length of program p. |
| $B_p$ = | The bandwidth required for broadcasting a single copy of program p. |
| $r_p$ = | Revenue per request for program p. |
| n, l = | Indices for nodes in the tree network, n, l = 0, 1, 2, . . . , N, where node 0 is the root of the tree. |
| $D_{np}$ = | The demand for program p at node n, given as number of requests per time unit. |
| NP = | $\{(n, p) \mid D_{np} > 0\}$. Thus, the doubleton (n, p) ∈ NP if program p is requested at node n. |
| l, m, q = | Indices for links in the network, l, m, q = 1, 2, . . . , N. The links are labeled so that the end-node of link l that is further away from node 0 is is node l. For example, in FIGURE 1, node 102 is labeled as node 1 and link 109 is labeled as link 1. |
| S(l) = | The set of successor links of link l. For example, in Figure 1, links 113, 114 and 115 (labeled as links 5, 6, 7) are successors of link 110 (labeled as link 2), implying that S(2) = {5, 6, 7}. |
| $c_l$ = | Bandwidth capacity of link l. |
| $a_{lp}$ = | 1 if program p is carried on link l and 0 otherwise. Thus, if for some (n, p) ∈ NP link l is on the path that connects nodes 0 and n, then $a_{lp} = 1$. |
| LP = | $\{(l, p) \mid a_{lp} = 1\}$. |
| $t_{lp}$ = | Decision variables in near-VOD: Time interval between successive broadcasts of program p on link l for (l, p) ∈ LP. $t_{lp}$ is also the time interval experienced at node l between successive broadcasts of program p for (l, p) ∈ NP. |
| $\alpha_{lp}$ = | The minimum time interval ($\alpha_{lp} > 0$) desired between successive broadcasts of program p on link l for (l, p) ∈ LP. |
| $\beta_{lp}$ = | The maximum time interval ($\beta_{lp} \geq \alpha_{lp}$) allowed between successive broadcasts of program p on link l for (l, p) ∈ LP. |
| $x_{lp}$ = | Decision variables: Bandwidth allocated on link l for program p, which can also be viewed as the bandwidth allocated to program p on the incoming link into node l. Let x be the vector $x = \{x_{lp}\}$ for (l, p) ∈ LP. |

Note that index l is used both for links and for nodes, and that link l is the incoming link into node l. (l, p)∈LP always refers to the doubleton (link l, program p), (l, p)∈NP always refers to the doubleton (node l, program p), and (n, p)∈NP always refers to the doubleton (node n, program p).

Since the average number of copies of program p that are carried simultaneously on link l is $T_p/t_{lp}$, $$x_{lp} = \frac{B_p T_p}{t_{lp}}, \quad (l, p) \in LP. \tag{1}$$

Let $\phi_{np}(t_{np})$ be the performance function associated with (n, p)∈NP. The performance function represents the dissatisfaction with the time interval between successive broadcasts of program p experienced at node n. $\phi_{np}(t_{np})$ is a continuous, strictly increasing function for $t_{np} \geq \alpha_{np}$; the larger $t_{np}$, the less satisfied the customers at node n would be. The invention is independent of the specific form of the performance function. As an example, a reasonable performance function is:

$$\varphi_{np}(t_{np}) = w_{np} \frac{t_{np} - \alpha_{np}}{\alpha_{np}}, \quad (n, p) \in NP. \tag{2}$$

In equation (2), $\phi_{np}(t_{np})$ is the weighted normalized deviation from the minimal time interval between successive broadcasts. The weight $w_{np}$ ($w_{np}>0$) might be the revenue expected from program p at node n per unit bandwidth per time unit; i.e., $w_{np}=(D_{np}r_p)/(B_p T_p)$. Note that if it is preferred to use weights that are independent of the demands $D_{np}$, then the weights depend only on the program p. In that case, the input needs to specify only which programs p should be provided at each node, but not the number of requests per time unit.

Although the model can be formulated in terms of decision variables $t_{lp}$, it is formulated with decision variables $x_{lp}$, which makes it independent of the delivery technology. Let $F_{np}(x_p)$ be the performance function associated with (n, p)∈NP. This performance function represents the dissatisfaction of customers for program p at node n with allocating bandwidth $x_{np}$ to program p on the incoming link into node n. As an example the performance function equivalent to equation (2), with variable $x_{np}$ instead of $t_{np}$, is:

$$F_{np}(x_{np}) = w_{np} \frac{B_p T_p / \alpha_{np} - x_{np}}{x_{np}}, \quad (n, p) \in NP. \tag{3}$$

$F_{np}(x_{np})$ is a nonlinear, continuous, strictly decreasing function for $x_{np} \geq 0$; the larger the bandwidth, the smaller the dissatisfaction. Again, the invention is independent of the specific form of the performance function and equation (3) should merely be viewed as an example. Let $L_{np}$ and $U_{np}$ be the lower and upper bounds for bandwidth required for program p at node n for (n, p)∈NP. Thus, from (1), $L_{np} = B_p T_p / \beta_{np} \geq 0$ and $U_{np} = B_p T_p / \alpha_{np} \geq L_{np}$ for (n, p)∈NP.

The objective is to determine equitable bandwidth allocations for all (n, p)∈NP, while satisfying all the constraints. This implies that the optimal solution is such that no performance function value, say $F_{n_1 p_1}(x_{n_1 p_1})$, can be feasibly decreased without increasing the value of another performance function, say $F_{n_2 p_2}(x_{n_2 p_2})$, whose value is equal to or larger than $F_{n_1 p_1}(x_{n_1 p_1})$. Since performance functions $F_{np}(x_{np})$ are strictly decreasing with $x_{np}$, the optimal solution is such that no decision variable value can be increased without decreasing the value of another decision variable whose performance function value is already at least as large. Such equitable resource allocation problems can be formulated as lexicographic minimax optimization problems.

FBAM is therefore formulated as a lexicographic minimax optimization problem that determines the optimal decision variables $x_{lp}$ for all (l, p)∈LP. A minimax problem is formulated first since the solution to the lexicographic minimax problem includes repeated solution of such minimax problems.

The Minimax Problem for FBAM $$V^* = \min_x \left[ \max_{(n,p) \in NP} F_{np}(x_{np}) \right] \tag{4.1}$$

so that $$\sum_{p=1}^{P} a_{lp} x_{lp} \leq c_l, \quad l = 1, 2, \ldots, N \tag{4.2}$$

$$x_{lp} \geq x_{mp}, \quad \text{for all } m \in S(l) \text{ for which } (m, p) \in LP \tag{4.3}$$

$$L_{lp} \leq x_{lp} \leq U_{lp}, \quad \text{for all } (l, p) \in LP. \tag{4.4}$$

Objective function (4.1) minimizes the largest performance function. Constraints (4.2) ensure that the link capacity constraints are satisfied. Constraints (4.3) specify the required ordering constraints. The bandwidth allocated for program p on link l should be at least as large as the bandwidth allocated for program p on all links m∈S(l) for which (m, p)∈LP. Note that if m∈S(l), (m, p)∈LP implies that (l, p) E LP. Obviously, for near-VOD, these ordering constraints imply that $t_{lp} \leq t_{mp}$ for all m∈S(l), where (m, p)∈LP. Constraints (4.4) impose lower and upper bounds on the decision variables.

Although the lower and upper bounds constraints (4.4) are typically independent of the links, they are allowed to be link-dependent since bounds may be changed on certain links in successive iterations of the Lexicographic Minimax Algorithm. However, without loss of generality, it is assumed that for (l, p) E LP these bounds satisfy: (i) $U_{lp} \leq c_l$; (ii) $U_{mp} \leq U_{lp}$ for all m∈S(l), where (m, p)∈LP, and (iii) $L_{mp} \leq L_{lp}$ for all m∈S(l), where (m, p)∈LP. If these relations are not satisfied, the bounds should be appropriately revised before the model is solved. In order to satisfy (ii) above, upper bounds are scanned starting from the root of the tree downwards, while decreasing upper bounds as appropriate. In order to satisfy (iii) above, lower bounds are scanned from the bottom of the tree upwards, while increasing lower bounds as appropriate. Hereinafter, the description assumes that the lower and upper bounds were adjusted as described above, and that the revised bounds satisfy $U_{lp} \geq L_{lp}$ for all (l, p)∈LP; otherwise the Minimax Problem for FBAM is infeasible.

Let $F^{(NP)}(x)$ be a vector composed of all the performance functions $F_{np}(x_{np})$ for (n, p)∈NP, where for a given vector x these performance functions are sorted in a non-increasing order. Thus, $$F^{(NP)}(x) = [F_{n_1 p_1}(x_{n_1 p_1}), F_{n_2 p_2}(x_{n_2 p_2}), F_{n_3 p_3}(x_{n_3 p_3}), \ldots], \tag{5.1}$$

where $$F_{n_1 p_1}(x_{n_1 p_1}) \geq F_{n_2 p_2}(x_{n_2 p_2}) \geq F_{n_3 p_3}(x_{n_3 p_3}) \geq \tag{5.2}$$

FBAM is now formulated as a lexicographic minimax problem. The objective function minimizes lexicographically the vector $F^{(NP)}(x)$, and the constraints are the same as in the minimax problem.

The Lexicographic Minimax Problem for FBAM $$V^L = \operatorname*{lexmin}_x [F^{(NP)}(x)] \tag{6.1}$$

so that $$\sum_{p=1}^{P} a_{lp} x_{lp} \leq c_l, \quad l = 1, 2, \ldots, N \tag{6.2}$$

$$x_{lp} \geq x_{mp}, \quad \text{for all } m \in S(l) \text{ for which } (m, p) \in LP \tag{6.3}$$

$$L_{lp} \leq x_{lp} \leq U_{lp}, \quad \text{for all } (l, p) \in LP. \tag{6.4}$$

Superscript L is used to denote optimal values for Lexicographic Minimax Problem for FBAM and * for optimal values for the Minimax Problem for FBAM. The solution method of the Lexicographic Minimax Problem includes repeatedly solving minimax problems in the format of the Minimax Problem for FBAM. After each solution of a minimax problem certain decision variables are fixed at their lexicographic optimal value and some parameters are updated.

The Minimax Algorithm for FBAM that solves the Minimax Problem for FBAM as formulated by objective function (4.1) and constraints (4.2) to (4.4) is now provided. Once the bounds were adjusted, the Minimax Problem for FBAM has a feasible solution if and only if $\Sigma_p a_{lp} L_{lp} \geq c_l$ for all links l. Suppose the Minimax Problem for FBAM has a feasible solution. The optimal solution V* can then be bounded by $V_{min} \leq V^* \leq V_{max}$, where $V_{min} = \max_{(n,p) \in NP} F_{np}(U_{np})$ and $V_{max} = \max_{(n,p) \in NP} F_{np}(L_{np})$.

Definition. V is feasible for the Minimax Problem for FBAM if there exists a vector x that satisfies constraints (4.2)-(4.4) and $F_{np}(x_{np}) \leq V$ for all (n, p)∈NP. If no such x exists, V is called infeasible.

Finding the optimal solution V* reduces to finding the smallest value of V that is feasible for the Minimax Problem for FBAM. The Minimax Algorithm for FBAM employs a bisection search to find V*. Several propositions that form the basis for the algorithm are presented below.

Proposition 1. Let x(V) be the vector x(V)={$x_{lp}$(V)} for all (l, p)∈LP, computed for any V≧$V_{min}$ through the following recursion:

$$x_{lp}(V) = \max\left\{L_{lp}, \max_{m \in S(l) \cap (m,p) \in LP}[x_{mp}(V)], F_{lp}^{-1}(V)\right\}, \quad (7)$$

for all (l, p) ∈ LP.

Then, V is feasible for the Minimax Problem for FBAM if and only if x(V) satisfies constraints (4.2)-(4.4). Note that the second term on the right is zero if m∈[S(l) ∩(m, p)∈LP]=Ø, and the third term is zero if (l, p)∉NP. Recursion (7) is computed separately for each program p, starting from the bottom of the tree on links that carry p, moving up.

Proposition 2. Suppose the Minimax Problem for FBAM is feasible and V* is the optimal objective function value of the Minimax Problem for FBAM. Then x(V*), computed by recursion (7) satisfies $x_{lp}$(V*)=$F_{lp}^{-1}$(V*) for some (l, p)∈NP.

The Minimax Problem for FBAM may have multiple optimal solutions. A solution x* is called the minimal solution of the Minimax Problem for FBAM if and only if x* is optimal for the Minimax Problem for FBAM and x*≦y*, where y* is any other optimal solution for the Minimax Problem for FBAM.

Proposition 3. Suppose the Minimax Problem for FBAM is feasible and V* is the optimal objective function value of the Minimax Problem for FBAM. Then x(V*), computed by recursion (7), is the minimal solution of the Minimax Problem for FBAM. The minimal solution is unique.

Proposition 4. Suppose x($V^1$) and x($V^2$) are computed for $V^1$≧$V_{min}$ and for $V^2$≧$V_{min}$, respectively, using recursion (7). Suppose $V^1$ is feasible for the Minimax Problem for FBAM and $V^2$ is not. Then, $V^2$<$V^1$.

The propositions above provide guidance to the algorithm described below. Similar variations of the algorithm below can readily be provided.

The Minimax Algorithm for FBAM
Step 0. Initialization.
  (a) If $\Sigma_p a_{lp} L_{lp}$>$c_l$ for some link l, STOP; the Minimax Problem for FBAM is infeasible.
  (b) Set $V_{min}$=$Max_{(n,p) \in NP} F_{np}(U_{np})$ and $V_{max}$=$max_{(n,p) \in NP} F_{np}(L_{np})$.
  (c) Compute x($V_{min}$) using recursion (7). If x($V_{min}$) satisfies constraints (4.2),
    STOP. V*=$V_{min}$ and x(V*) is the minimal solution for the Minimax Problem for FBAM.
  (d) Delete from constraints (4.2) all indices l for which the corresponding constraint is satisfied by x($V_{min}$).
Step 1. Bisection Search.
  (a) For each program p, compute x(V) for V=($V_{min}$+$V_{max}$)/2 using recursion (7).
  (b) If x(V) satisfies all constraints (4.2) that have not been deleted, set $V_{max}$=V and go to Step 2.
  (c) Set $V_{min}$=V. Delete from constraints (4.2) those that are satisfied by x(V).
Step 2. Termination Test.
  (a) If $V_{max}$-$V_{min}$>ε (where ε is an arbitrarily small positive number), return to Step 1(a).
  (b) Compute x($V_{max}$) and STOP; x($V_{max}$) is the minimal solution to the Minimax Problem for FBAM and V*=$V_{max}$(optimal within an ε).

Upon termination, constraints (4.2) that are satisfied as equality (within an arbitrarily small ε'>0) are referred to as critical constraints or critical links. The algorithm terminates at Step 0 only if some variables of x($V_{min}$) are at their upper bounds, whereas termination at Step 2 implies that x(V) results in some critical constraints. At each iteration, the effort spent on computing x(V) is on the order of O(P*$N^2$) and the effort spent on evaluating whether constraints (4.2) are satisfied or not is O(P*N) (more precisely, it is O(LP)). The number of iterations is ⌈log [($V_{max}$-$V_{min}$)/ε]/log 2⌉. The computational effort can be somewhat reduced using the following proposition.

Variations of the algorithm above for solving the Minimax Problem for FBAM can readily be provided.

Proposition 5. Suppose the Minimax Problem for FBAM is feasible, but $V^2$ is not feasible for the Minimax Problem for FBAM. Let TREE($l_1$) be the subtree of the original tree with node $l_1$ as its root. If $x_{lp}$($V^2$)≦$L_{lp_1}$ for all links l ∈TREE($l_1$) for which (l, $p_1$)∈LP and $x_{l_1 p_1}$($V^2$)=$L_{l_1 p_1}$, then $x_{l_1 p_1}$*=$L_{l_1 p_1}$.

Using Proposition 5, after each iteration variables that can be fixed at their lower bound may be found. These variables can be deleted from the set LP, while the corresponding link capacities in constraints (4.2) are updated. Note that the second term in recursion (7), $max_{m \in S(l), (m,p) \in LP}[x_{mp}(V)]$, should be revised to include lower bounds of deleted variables.

The Lexicographic Minimax Algorithm for FBAM solves the Lexicographic Minimax Problem for FBAM as formulated by objective function (6.1) and constraints (6.2) to (6.4). The solution is obtained by repeatedly using the Minimax Algorithm for FBAM to solve minimax problems, each in the format of the Minimax Problem for FBAM. Based on the minimal solution of each of these minimax problems, some of the variables are fixed at their lexicographic minimax value (denoted as $x_{lp}^L$).

Let V* and x* be the minimax objective value and the corresponding minimal solution of Minimax the Minimax Problem for FBAM. The rules for fixing variables at their lexicographic minimax values are: (i) If $x_{l_1 p_1}$*=$U_{l_1 p_1}$, then $x_{l_1 p_1}^L$=$U_{l_1 p_1}$; and (ii) If variable ($l_1$, $p_1$)∈LP and $l_1$ is a critical constraint, then, $x_{l_1 p_1}^L$=$x_{l_1 p_1}$*.

Once variables are fixed, the next minimax problem with the additional constraints of fixed variables can be solved. Alternatively, the fixed variables can be deleted from the formulation of the next minimax problem, while updating link capacities $c_1$, and lower and upper bounds $L_{lp}$ and $U_{lp}$, on some variables. The bounds need to be updated so that the ordering constraints that involve deleted variables are preserved. The values of $V_{min}$ and $V_{max}$ are also recomputed. The process continues, where after the solution of each revised minimax problem some variables are fixed and deleted. The algorithm terminates once all variables are fixed at their lexicographic minimax values.

The Lexicographic Minimax Algorithm for FBAM
Step 1. Use the Minimax Algorithm for FBAM to solve the Minimax Problem for FBAM (in the first iteration, with the original parameters). The minimax objective function value is V* and the minimal solution is x*.
Step 2. If V*=$V_{min}$ (where $V_{min}$ is taken from Step 0(b) of the Minimax Algorithm for FBAM solved above), identify variables (l, p) for which $x_{lp}$*=$U_{lp}$. These variables satisfy $x_{lp}^L$=$U_{lp}$. Fix these variables at these values.
Step 3. Identify all critical constraints from among the remaining constraints (4.2).

Suppose constraint $l_1$ is a critical constraint. Fix all variables $(l_1, p) \in LP$ at $x_{l_1p}^L = x_{l_1p}^*$. Repeat the above for each critical constraint.

Step 4. Let FIX=$\{(l, p)\}$ be the set of all variables fixed in this iteration in steps 2 and 3. Exclude all variable $(l, p) \in FIX$ from the sets LP and NP defined for the next minimax problem. If NP=$\emptyset$, STOP. The lexicographic minimax problem is solved.

Step 5. Delete from constraint (4.2) critical constraints and constraints with no variables left. Update $c_i \leftarrow c_i - \Sigma_{p:(l,p) \in FIX} x_{lp}^L$ for all remaining constraints in (4.2).

Step 6. For each $(l, p) \in FIX$, update $U_{mp} \leftarrow \min[U_{mp}, x_{lp}^L]$ for all $m \in S(l)$ for which $(m, p) \in LP$.

Step 7. For each link l, find all $(m, p) \in FIX$ where $m \in S(l)$. For each p with such $(m, p) \in FIX$, update $L_{lp} \leftarrow \max\{L_{lp}, \max_{(m,p) \in FIX \cap m \in S(l)}[x_{mp}^L]\}$.

Step 8. Update $V_{max} = \min\{\max_{(n,p) \in NP}[F_{np}(L_{np})], V^*\}$. (This overrides $V_{max}$ as computed in Step 0(b) of the Minimax Algorithm for FBAM.)

Step 9. Return to Step 1 to solve the next minimax problem.

Similar variations of the algorithm above can readily be provided.

Note that the number of lexicographic iterations (number of minimax problems that are solved) will not exceed the number of variables in the initial set NP since at least one variable is fixed at each iteration. Proposition 6, given below, is used in Step 8 to narrow the search interval of the Minimax Algorithm.

Proposition 6. Let FIX(i) and V*(i) be the set FIX and the minimax objective value at the i-th iteration of the Lexicographic Minimax Algorithm for FBAM. Then, (i) V*(i)$\leq$V*(i-1), and (ii) if all $(l, p) \in FIX(i)$ are associated with critical constraints, V*(i)<V*(i-1).

The Minimax Algorithm for FBAM and the Lexicographic Minimax Algorithm for FBAM can readily handle performance functions that are non-increasing, rather than strictly decreasing. Recursion (7) needs then to be changed to:

$$x_{lp}(V) = \min\left[\max\left\{L_{lp}, \max_{m \in S(l) \cap (m,p) \in LP}[x_{mp}(V)], F_{lp}^{-1}(V)\right\}\right], \quad (8)$$

for all $(l, p) \in LP$.

Thus, if $x_{lp}(V)$ is determined by the third term in the max operator, the smallest possible $x_{lp}(V) = F_{lp}^{-1}(V)$ would be selected.

The Lexicographic Minimax Algorithm for FBAM also provides an ordered list of critical constraints (critical links) which can be used to assist in the optimal planning of bandwidth capacity expansion in the network. The critical links identified at the first iteration are at the top of the list, those identified at the second iteration are next, and so forth. The lexicographic minimax solution would be improved by adding capacity to links, starting with the links that were determined as critical at the first iteration, then to the critical links of the second iteration, and so forth. Since in any period (where a period could be, for example, a month or three months) capacity can be added to a limited number of links due to budget constraints, the ordered list of critical links provides an optimal multi-period capacity expansion plan. Note that once a link capacity is expanded, it may be prudent to resolve the problem since some of the links that were deleted without being fully utilized may now be critical at some iteration.

The Constrained Bandwidth Allocation Model (CBAM)

This invention also provides a method that has more restrictions on feasible bandwidth allocation. In FBAM, the bandwidth allocated to program p may be different on any outgoing link from a node. Obviously, this flexibility promotes excellent service. However, service providers may feel that such designs are too complex and require excessive maintenance and control. The second model is referred to as the constrained Bandwidth Allocation Model (CBAM). CBAM imposes the additional constraints where for, any program p, the same bandwidth is allocated on each of the links that carries program p and emanates from the same node.

Without loss of generality, for any l, all lower bounds $L_{mp}$ are assumed to be the same and all upper bounds $U_{mp}$ are assumed to be the same for all $m \in S(l)$ for which $(m, p) \in LP$. From here on, q is also used as an index for links. Link q has as its successor's links indexed by l and link l has as its successor's links indexed by m. To simplify the presentation below, link q=0 is added as an incoming link into node 0 with $(0, p) \in LP$ for all p. The following constraints are added to the Minimax Problem for FBAM and to the Lexicographic Minimax Problem for FBAM:

$$x_{l_1p} = x_{l_2p} \text{ for all } l_1, l_2 \in S(q) \text{ for which } (l_1, p), (l_2, p) \in LP,$$
$$\text{for } q=0, 1, \ldots, N. \quad (9)$$

The Minimax Algorithm for CBAM is similar to that provided for FBAM. Let V be defined as feasible for the Minimax Problem for FBAM with added constraints (9) if there exists a vector x that satisfies constraints (4.2)-(4.4) and constraints (9), and $F_{np}(x_{np}) \leq V$ for all $(n, p) \in NP$. If no such x exists, V is called infeasible. Recursion (7), used to compute x(V), is changed in order to satisfy constraints (9). The revised recursion is as follows:

Computation of x(V) for program p:

For each link q for which $(q, p) \in LP$, compute $$z_{lp}(V) = \max\left\{L_{lp}, \max_{m \in S(l) \cap (m,p) \in LP}[x_{mp}(V)], F_{lp}^{-1}(V)\right\} \quad (10.1)$$

for all $l \in S(q)$ for which $(l, p) \in LP$ $$x_{lp}(V) = \max_{l \in S(q) \cap (l,p) \in LP}[z_{lp}, (V)] \quad (10.2)$$

for all $l \in S(q)$ for which $(l, p) \in LP$.

In recursion (10.1), the second term on the right is zero if $[m \in S(l) \cap (m,p) \in LP] = \emptyset$, and the third term is zero if $(l, p) \notin NP$. Recursions (10.1)-(10.2) is computed separately for each program p, starting from the bottom of the tree on links that carry p, moving up. Consider again FIG. 1 and suppose Program p is requested at nodes 3 (104), 5 (106), and 7 (108). Hence, program p is carried on links 3 (111), 5 (113), 7 (115), 1 (109) and 2 (110). Recursion (10.2) first computes $x_{3p}(V) = z_{3p}(V)$. Then, recursion (10.1) is used to compute $z_{5p}(V)$ and $z_{2p}(V)$, and by recursion (10.2), $x_{5p}(V) = x_{2p}(V) = \max[z_{5p}(V), z_{2p}(V)]$. Finally, recursion (10.1) is used to compute $z_{1p}(V)$ and $z_{2p}(V)$, and recursion (10.2) is used to compute $x_{1p}(V) = x_{2p}(V) = \max[z_{1p}(V), z_{2p}(V)]$.

The Minimax Algorithm for CBAM

Use the Minimax Algorithm for FBAM with recursion (10.1)-(10.2) instead of recursion (7) in step 1 (a).

Propositions 1-6, with minor wording changes, still hold. The computational effort is also the same as for FBAM.

The Lexicographic Minimax Algorithm for CBAM is the same as that described for FBAM with minor changes. In particular, the Minimax Algorithm for CBAM is used and additional variables are set to their lexicographic value. Suppose $l_j \in S(q)$ is a critical constraint and $(l_j, p_j) \in LP$. Then, as described in Step 3 of the Lexicographic Minimax Algorithm for FBAM, variable $(l_j, p_j)$ is set to its lexicographic minimax value, namely, $x_{l_jp_1}^L = x_{l_jp_1}^*$ ($x^*$ is the minimal solution of the minimax problem solved at that iteration). The algorithm for CBAM also sets $x_{l_jp_1}^L = x_{l_jp_1}^*$ for all $l \in S(q)$ for which $(l, p_j) \in LP$. Although these variables may not be associated with critical constraints, fixing them at that iteration follows from constraints (9).

The Lexicographic Minimax Algorithm for CBAM

Use the Lexicographic Minimax Algorithm for FBAM with revised Step 1 and revised Step 4 as follows.

Step 1. Use the Minimax Algorithm for CBAM to solve the Minimax Problem for CBAM (in the first iteration, with the original parameters). The minimax objective function value is $V^*$ and the minimal solution is $x^*$.

Step 4. Let FIX=$\{(l, p)\}$ be the set of all variables fixed in this iteration in steps 2 and 3. Suppose critical constraint $l_j \in S(q)$. For each $(l_j, p_j) \in FIX$, add to FIX variables $(l, p_j)$ for all $l \in S(q)$ for which $(l, p_j) \in LP$, and set $x_{lp_1}^L = x_{lp_1}^*$. Exclude all variable in the augmented set FIX from the sets LP and NP defined for the next minimax problem. If NP=$\emptyset$, STOP. The lexicographic minimax problem is solved.

As for FBAM, the Minimax Algorithm for CBAM and the Lexicographic Minimax Algorithm for CBAM can readily handle performance functions that are non-increasing, rather than strictly decreasing. Recursion (10.1) needs then to be revised, where the smallest possible value of $z_{lp}(V)$ that satisfies recursion (10.1) would be selected.

As for FBAM, the Lexicographic Minimax Algorithm for CBAM also provides an ordered list of critical links which, in turn, provides an optimal multi-period capacity expansion plan.

Figure 2:
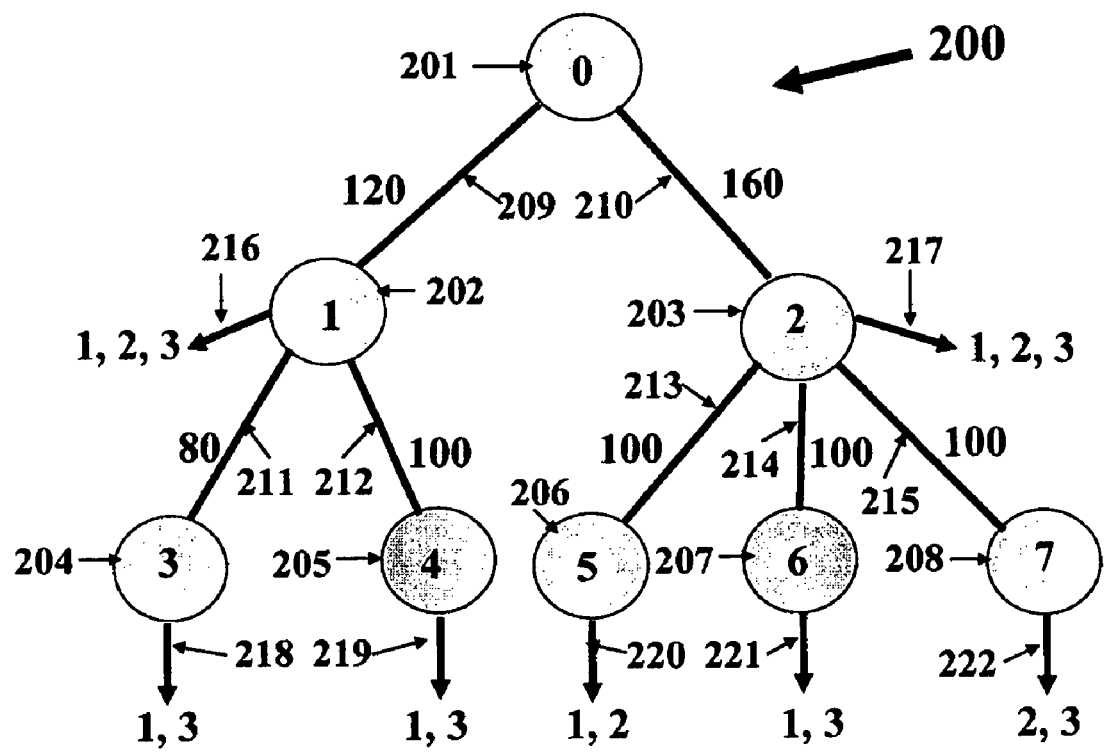
FIG. 2 presents input for an example of the bandwidth allocation problem solved for illustration purposes.

Further clarification of the invention is provided through the solution of a small example of the VOD tree network 200 shown in FIG. 2. The network comprises eight nodes 201-208, where node 201 is the root node with the server. The nodes are interconnected by links 209-215. The number adjacent to a link is the link's capacity. For example, link 209 has a capacity of 120 units, often expressed in megabits per second (Mbs). The server at node 0 broadcasts P=3 VOD programs. Arrows 216-222, outgoing from the respective nodes 1-7, represent the demand for programs at the node. The numbers adjacent to the arrows are the programs requested at the node. For example, as shown by arrow 218, node 204 has demands for programs 1 and 3.

The example uses for illustration near-VOD delivery with time intervals between successive broadcasts of each program that are translated to bandwidth, which are then allocated on each link. Suppose that the bandwidths required for a single copy of a program are $B_p$=5 Mbs for p=1, 2, 3, the program lengths are $T_1$=40 minutes, $T_2$=60 minutes, and $T_3$=100 minutes, and the minimum and maximum time intervals between successive broadcasts are $\alpha_{lp}$=5 minutes and $\beta_{lp}$=10 minutes for all (l, p)$\in$LP. From FIG. 2, the sets LP=NP=$\{(1, 1), (1, 2), (1, 3), (2,1), (2, 2), (2, 3), (3, 1), (3, 3), (4, 1), (4, 3), (5, 1), (5, 2), (6, 1), (6, 3), (7, 2), (7, 3)\}$. Although in this example the two sets are the same, it need not be the case (e.g., if not all three programs were requested at nodes 1 and 2). The lower and upper bounds $L_{lp}$ and $U_{lp}$ are derived from equation (1). The performance functions assumed in this example are given by equation (3) for all (n, p)$\in$NP. Program 3 in this example is expected to get better service than programs 1 and 2, so the weights in the performance functions are set to $w_1$=$w_2$=1 and $w_3$=1.2. Table 1 presents the specific bounds and performance functions.

TABLE 1

Lower and Upper Bounds and the Performance Functions

| p | $L_{lp}$ | $U_{lp}$ | $F_{np}(x_{np})$ | $F_{np}^{-1}(V)$ |
|---|---|---|---|---|
| 1 | 20 | 40 | $(40 - x_{np})/x_{np}$ | $40/(V + 1)$ |
| 2 | 30 | 60 | $(60 - x_{np})/x_{np}$ | $60/(V + 1)$ |
| 3 | 50 | 100 | $1.2(100 - x_{np})/x_{np}$ | $120/(V + 1.2)$ |

Solution of FBAM

Table 2 presents the results of the Minimax Algorithm for FBAM in the first iteration of the Lexicographic Minimax Algorithm for FBAM. Initially, $V_{min}$=0 and $V_{max}$=1.200. Each row provides the result for a single iteration of the Minimax Algorithm. In the last row, $V_{max}$-$V_{min} \leq \epsilon$=0.01. The solution associated with $V_{max}$ is selected as the minimax solution (shown in bold font) since it provides a feasible solution to the Minimax Problem for FBAM.

TABLE 2

Results of the First Minimax Algorithm for FBAM

| $V_{min}$ | $V_{max}$ | V | $x_{n1}$ for all (n, 1) $\in$ NP | $x_{n2}$ for all (n, 2) $\in$ NP | $x_{n3}$ for all (n, 3) $\in$ NP |
|---|---|---|---|---|---|
| 0.000 | 1.200 | 0.600 | 25.000 | 37.500 | 66.667 |
| 0.600 | 1.200 | 0.900 | 21.053 | 31.579 | 57.143 |
| 0.600 | 0.900 | 0.750 | 22.857 | 34.286 | 61.538 |
| 0.750 | 0.900 | 0.825 | 21.918 | 32.877 | 59.259 |
| 0.825 | 0.900 | 0.863 | 21.477 | 32.215 | 58.182 |
| 0.825 | 0.863 | 0.844 | 21.692 | 32.538 | 58.708 |
| 0.844 | 0.863 | 0.854 | 21.581 | 32.371 | 58.437 |
| 0.854 | 0.863 | 0.863 | 21.477 | 32.215 | 58.182 |

Table 3 presents the results of the Lexicographic Minimax Algorithm. Thus, the first iteration has $V^*$=0.863. Equation 3 is a critical constraints and variables (3, 1) and (3, 3) are fixed at their optimal value. In the second iteration, equation 1 is critical, and variables (1, 1), (1, 2) and (1, 3) are fixed. These variables impose new upper bounds on variables (4, 1) and (4, 3). Thus, in iteration 3, variables (4, 1) and (4, 3) are fixed at their revised upper bounds and constraint 4 is deleted since all variables at constraint 4 were fixed. Iterations 4, 5 and 6 have critical constraints 7, 6 and 2, respectively. Finally, at iteration 7, constraint 5 is deleted without being a critical constraint, while variables (5, 1) and (5, 2) are fixed at upper bounds that were revised in the previous iteration.

TABLE 3

Results of the Lexicographic Minimax Algorithm for FBAM

| Iteration | $V^*$ | Critical constraints/ Deleted constraints | Optimal Variables |
|---|---|---|---|
| 1 | 0.863 | 3 | $x_{31}^L$ = 21.477, $x_{33}^L$ = 58.182 |
| 2 | 0.736 | 1 | $x_{11}^L$ = 23.041, $x_{12}^L$ = 34.562, $x_{13}^L$ = 61.983 |
| 3 | 0.736 | 4 (deleted) | $x_{41}^L$ = 23.041, $x_{43}^L$ = 61.983 |
| 4 | 0.673 | 7 | $x_{72}^L$ = 35.864, $x_{73}^L$ = 64.068 |
| 5 | 0.463 | 6 | $x_{61}^L$ = 27.341, $x_{63}^L$ = 72.159 |
| 6 | 0.276 | 2 | $x_{21}^L$ = 31.360, $x_{22}^L$ = 47.040, $x_{23}^L$ = 81.328 |
| 7 | 0.276 | 5 (deleted) | $x_{51}^L$ = 31.360, $x_{52}^L$ = 47.040 |

Note that the equitable solution (the lexicographic minimax solution) provides different service at different nodes. For instance, the bandwidths provided to program 1 at nodes 3 and 5 are 21.477 and 31.360, respectively.

The results also identify the ordered list of critical links that should be expanded. As table 3 shows, link 3 is at the top of the list of critical links, followed by link 1, 7, 6, 2. Thus link 3 should be expanded first, then link 1, and so forth. Note that increasing the capacity of link 3 would improve service to node 3. Increasing the capacity of link 1 would improve service to nodes 1 and 4. The latter is seen from iterations 2 and 3, as link 4 cannot be fully utilized due to upper bounds imposed by bandwidth allocations at link 1.

The optimally allocated bandwidth readily imply through equation (1) optimal time intervals for near-VOD delivery between successive broadcasts for any program on each of the links.

Solution of CBAM

Recall that CBAM enforces constraints (9) so that for any program p, the same bandwidth is allocated on all links that carry program p and emanate from the same node. Table 4 presents the results of the Lexicographic Minimax Algorithm for CBAM. As expected, CBAM has more links that are not fully utilized. At the first iteration, link 3 is fully utilized while link 4 is not. At the second iteration, link 1 is fully utilized, while link 2 is not. At the third iteration links 5, 6 and 7 are all not fully utilized due to upper bounds imposed by the allocations at link 2. Although CBAM simplifies network control, it may leads to excessive underutilization of links. As the results indicate, insufficient capacity on link 1 affects directly, or indirectly, bandwidth allocated on all other links in the network (except for link 3). In particular, it affects bandwidth allocated on link 2, which, in turn, affects bandwidth allocated on links 5, 6 and 7.

TABLE 4

Results of the Lexicographic Minimax Algorithm for CBAM

| Iteration | V* | Critical constraints/ Deleted constraints | Optimal Variables |
|---|---|---|---|
| 1 | 0.863 | 3, 4 (deleted) | $x_{31}^L = x_{41}^L = 21.477$, $x_{33}^L = x_{43}^L = 58.182$ |
| 2 | 0.736 | 1, 2 (deleted) | $x_{11}^L = x_{21}^L = 23.041$, $x_{12}^L = x_{22}^L = 34.562$, $x_{13}^L = x_{23}^L = 61.983$ |
| 3 | 0.736 | 5, 6, 7 (all deleted) | $x_{51}^L = x_{61}^L = 23.041$, $x_{52}^L = x_{72}^L = 34.562$, $x_{63}^L = x_{73}^L = 61.983$ |

As Table 4 shows, link 3 is at the top of the list of critical links, followed by link 1. Thus, link 3 should be expanded first, and then link 1. Note that increasing the capacity of link 3 would allow using more of the available bandwidth on link 4, thus improving the service to nodes 3 and 4. Increasing the capacity of link 1 would allow using more of the available bandwidth on link 2, as well as the available bandwidth on links 5, 6 and 7, thus improving the service to nodes 1, 2, 5, 6 and 7.

While there has been described and illustrated methods of allocating bandwidth for video-on-demand networks, it will be apparent to those skilled in the art that variations and modifications are possible without deviating from the teachings and broad scope of the invention which shall be limited solely by the scope of the claims appended hereto.

What is claimed is

1. A method for determining bandwidth allocation, the method comprising:
   at least initiating a transmission of a plurality of at least portions of content from a root node of a tree topology network along a path comprising a plurality of links connecting nodes through the tree topology network to at least one destination node;
   allocating bandwidth for the plurality of at least portions of content carried on a respective link, the respective link having an available bandwidth capacity such that a sum of the allocated bandwidths of all of the plurality of at least portions of content carried on the respective link does not exceed the available bandwidth capacity of the respective link; and
   using a Lexicographic Minimax Algorithm for a Flexible Bandwidth Allocation Model (FBAM) or a Constrained Bandwidth Allocation Model (CBAM) to provide bandwidth allocations to the plurality of at least portions of content and to determine an ordered list from the plurality of links from a most critical link to a least critical link.

2. The method of claim 1 further comprising assigning a performance function to a respective at least a portion of content carried on a respective node which expresses satisfaction from video service as a function of bandwidth allocated to the respective at least a portion of content on an incoming link to the respective node.

3. The method of claim 1 wherein using a Lexicographic Minimax Algorithm for the FBAM or the CBAM to provide bandwidth allocations to the plurality of at least portions of content comprises using a Lexicographic Minimax Algorithm for the FBAM or the CBAM to provide equitable bandwidth allocations to the plurality of at least portions of content.

4. The method of claim 1 wherein for the FBAM an allocated bandwidth for a respective at least a portion of content carried on a link is within a predetermined range and the allocated bandwidth for the respective content can be decreased but not increased from one link to a next link along a path from the root node through the network to the at least one destination node.

5. The method of claim 1 wherein for the CBAM a same bandwidth is allocated for a respective at least a portion of content on links emanating from a node on which the respective at least a portion of content is carried.

6. A non-transitory computer readable medium having instructions for determining bandwidth allocation stored thereon, the instructions comprising:
   instructions to at least initiate a transmission of a plurality of at least portions of content from a root node of a tree topology network along a path comprising a plurality of links connecting nodes through the tree topology network to at least one destination node;
   instructions to allocate bandwidth for the plurality of at least portions of content carried on a respective link, the respective link having an available bandwidth capacity such that a sum of the allocated bandwidths of all of the plurality of at least portions of content carried on the respective link does not exceed the available bandwidth capacity of the respective link; and
   instructions to use a Lexicographic Minimax Algorithm for a Flexible Bandwidth Allocation Model (FBAM) or a Constrained Bandwidth Allocation Model (CBAM) to provide bandwidth allocations to the plurality of at least portions of content and to determine an ordered list from the plurality of links from a most critical link to a least critical link.

7. The non-transitory computer readable medium of claim 6, the instructions further comprising instructions to assign a performance function to a respective at least a portion of content carried on a respective node which expresses satisfaction from video service as a function of bandwidth allocated to the respective at least a portion of content on an incoming link to the respective node.

8. The non-transitory computer readable medium of claim 6 wherein the instructions to use the Lexicographic Minimax Algorithm for the FBAM or the CBAM to provide bandwidth allocations to the plurality of at least portions of content comprise instructions to use a Lexicographic Minimax Algorithm for the FBAM or the CBAM to provide equitable bandwidth allocations to the plurality of at least portions of content.

9. The non-transitory computer readable medium of claim 6 wherein for the FBAM an allocated bandwidth for a respective at least a portion of content carried on a link is within a predetermined range and the allocated bandwidth for the respective at least a portion of content can be decreased but not increased from one link to a next link along a path from the root node through the network to the at least one destination node.

10. The non-transitory computer readable medium of claim 6 wherein for the CBAM a same bandwidth is allocated for a respective at least a portion of content on links emanating from a node on which the respective at least a portion of content is carried.

11. An apparatus for allocating bandwidth, the apparatus comprising:
a processing device;
a server having a plurality of content; and
a tree topology network emanating from the server and comprising a plurality of links connecting a plurality of nodes to at least one destination node, wherein a respective link has an available bandwidth capacity such that a sum of bandwidth allocated to content carried on the respective link does not exceed the available bandwidth capacity of the respective link;
wherein the processing device is configured to transmit at least a portion of the plurality of content, allocate bandwidth for the at least a portion of the plurality of content using a Lexicographic Minimax Algorithm for a Flexible Bandwidth Allocation Model (FBAM) or a Constrained Bandwidth Allocation Model (CBAM), and determine an ordered list from the plurality of links from a most critical link to a least critical link.

12. The apparatus of claim 11 wherein the processing device is further configured to assign a performance function to a respective at least a portion of content carried on a respective node which expresses satisfaction from video service as a function of bandwidth allocated to the respective at least a portion of content on an incoming link to the respective node.

13. The apparatus of claim 11 wherein the processing device configured to allocate bandwidth for the plurality of content using the Lexicographic Minimax Algorithm for the FBAM or the CBAM comprises the processing device configured to equitably allocate bandwidth for the plurality of content using a Lexicographic Minimax Algorithm for the FBAM or the CBAM.

14. The apparatus of claim 11 wherein for the FBAM an allocated bandwidth for a respective content carried on a link is within a predetermined range and the allocated bandwidth for the respective content can be decreased but not increased from one link to a next link along a path from the root node through the network to the at least one destination node.

15. The apparatus of claim 11 wherein for the CBAM a same bandwidth is allocated for a respective at least a portion of content on links emanating from a node on which the respective at least a portion of content is carried.

* * * * *

UNITED STATES PATENT AND TRADEMARK OFFICE
CERTIFICATE OF CORRECTION

| | | |
|---|---|---|
| PATENT NO. | : 7,957,397 B2 | Page 1 of 1 |
| APPLICATION NO. | : 12/686947 | |
| DATED | : June 7, 2011 | |
| INVENTOR(S) | : Luss | |

It is certified that error appears in the above-identified patent and that said Letters Patent is hereby corrected as shown below:

Title page, item (73), under "Assignee", in Column 1, Line 1, delete "Wilimignton," and insert -- Wilmington, --.

Signed and Sealed this
Twentieth Day of September, 2011

David J. Kappos
*Director of the United States Patent and Trademark Office*